April 5, 1960 W. H. HEBRANK 2,931,332
HIGH SPEED AQUATIC DEVICE FOR SWIMMERS AND OTHER PURPOSES
Filed June 13, 1955 3 Sheets-Sheet 1
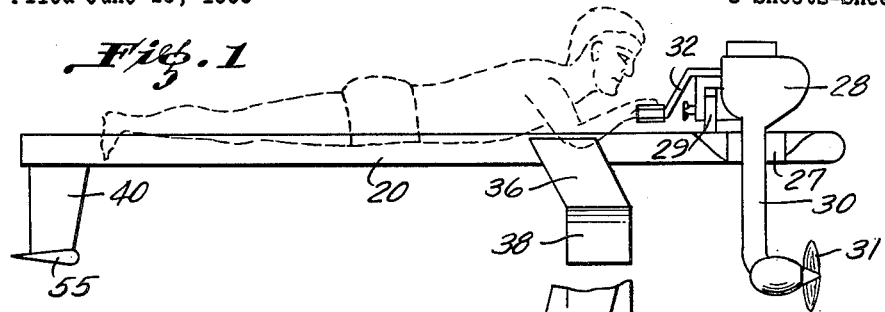
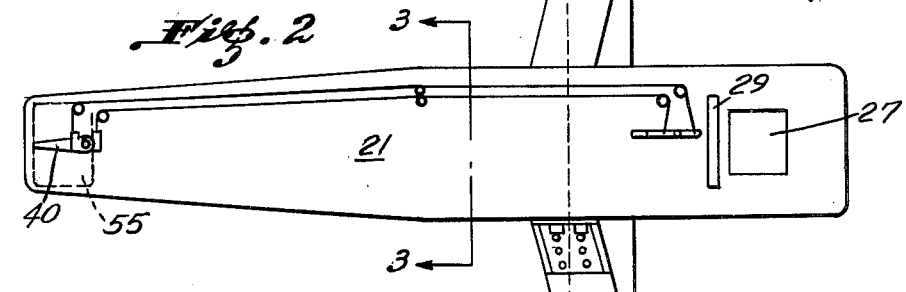
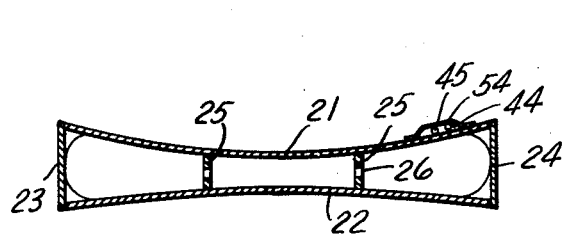
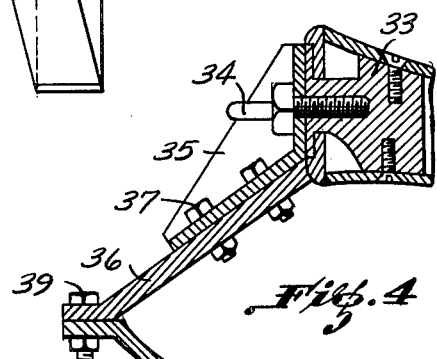
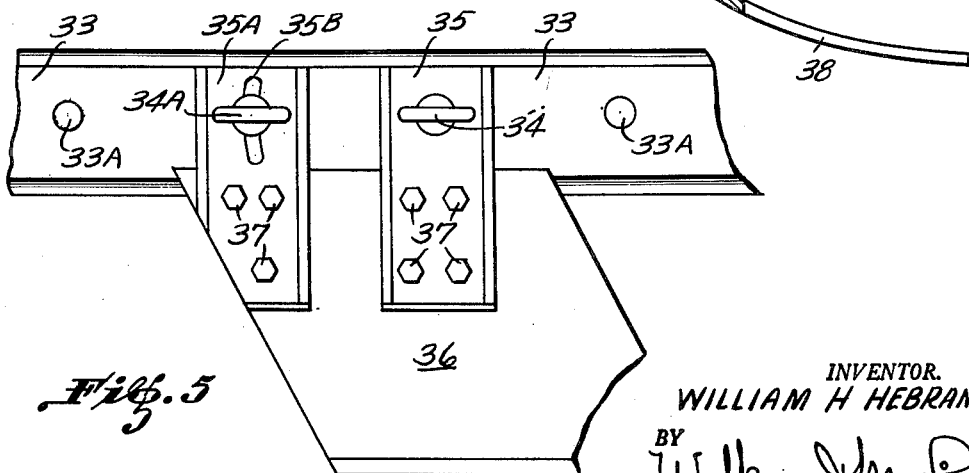
INVENTOR.
WILLIAM H HEBRANK
BY
Wilkinson Mawhinney
Attorneys April 5, 1960     W. H. HEBRANK     2,931,332
HIGH SPEED AQUATIC DEVICE FOR SWIMMERS AND OTHER PURPOSES
Filed June 13, 1955     3 Sheets-Sheet 2

INVENTOR
WILLIAM H. HEBRANK
By Wilkinson Mawhinney
Attorneys

April 5, 1960 W. H. HEBRANK 2,931,332
HIGH SPEED AQUATIC DEVICE FOR SWIMMERS AND OTHER PURPOSES
Filed June 13, 1955 3 Sheets-Sheet 3
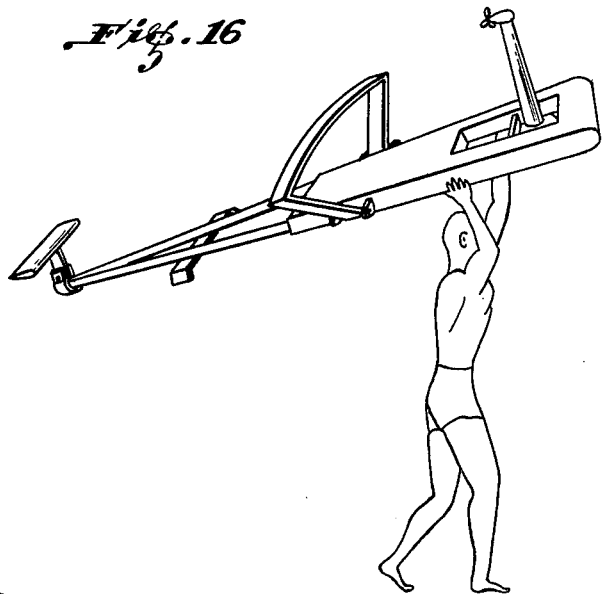
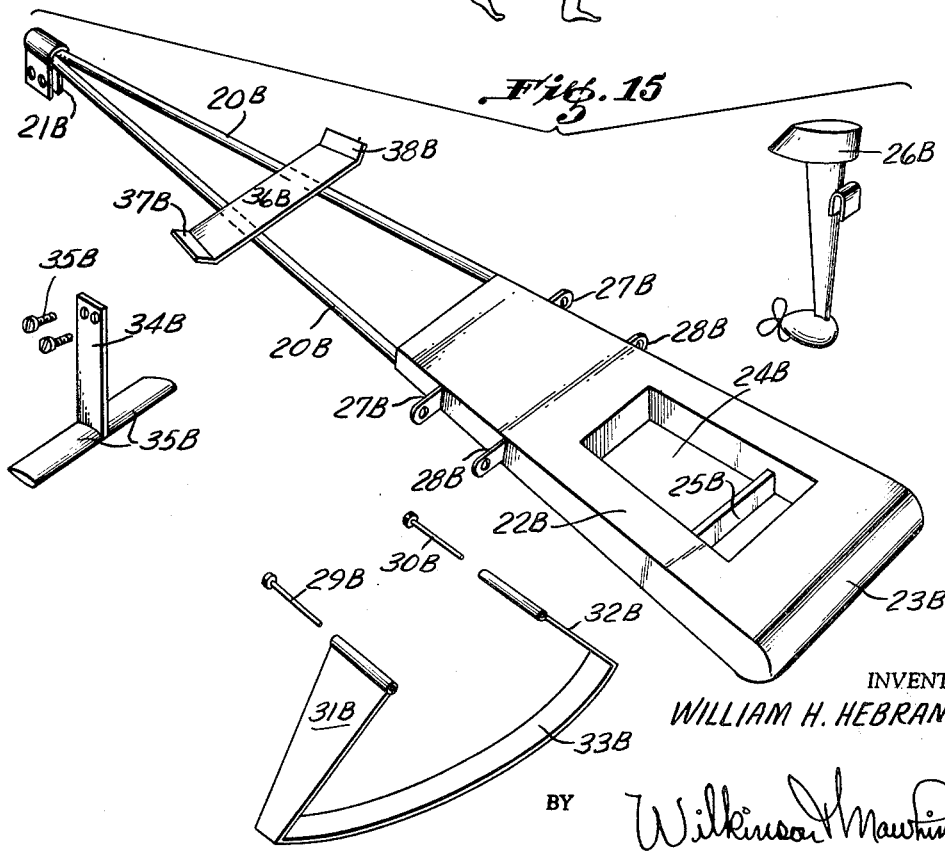
INVENTOR
WILLIAM H. HEBRANK
BY
ATTORNEYS

2,931,332

HIGH SPEED AQUATIC DEVICE FOR SWIMMERS AND OTHER PURPOSES

William H. Hebrank, Severna Park, Md., assignor of forty percent to Lane McLean, Todd County, Ky.

Application June 13, 1955, Serial No. 515,130

4 Claims. (Cl. 115—70)

The present invention relates to high speed aquatic device for swimmers and for other purposes and has for an object to attach hydrofoils and a propulsion means to a swimmer through the medium of a support having positive buoyancy in a static condition but not having the drag and planing effect or hydrodynamic lift characteristics in a flying condition.

Another object of the present invention is to provide a compact device for supporting and transporting one person which device may be quickly assembled and disassembled and which is light in weight and may be compactly carried on a car top or in a submarine or in any other transportation facility desired.

A further object of the present invention is to provide a device which a swimmer may approach and swim onto in the water and which may be used to make fast exploratory flights into shallow water heretofore unattemptable by conventional hull craft equipped with hydrofoils. This device can also travel in moderately rough water at speeds which are unattainable by any known water craft having equal power in its propulsion system.

Another object of the invention is to provide a device as described in the previous paragraphs which also acts as a support for a swimmer, being long in length, narrow in width and thin in depth. The prior art constructions such as U.S. Patent No. 2,045,645 to E. C. Hansen rely on planing characteristics and remain water borne in use causing considerable drag especially in rough water resulting in decreased speed and control. I propose by the application of hydrofoils to the support to elevate the support above the surface of the water so that it does not contribute any hydrodynamic lift and to thereby eliminate its drag effect and increase speed and/or at the same time reduce fuel consumption resulting in an increase of range of the craft.

As shown in U.S. Patent No. 1,976,046 to O. G. Tietjens, hydrofoils have been applied to the hull of a vessel heretofore; however it will be noted from this patent that the vessel hull has hydrodynamic characteristics which must be closely integrated into a particular design.

The hull of watercraft as illustrated by Tietjens is the portion of the craft adapted to carry people or other useful loads. It represents a structure which partly encloses the occupants to provide certain protection and comfort within which people sit or stand. The hydrofoil craft described by Tietjens and others consists of a conventional water craft hull to which foils have been attached.

The device of the present invention attempts to get as close as possible to the situation where motor and foils are fastened to the person. The support here deviates from being a harness for the person only insofar as is necessary to provide sufficient rigidity for foil and motor alignment, to provide sufficient buoyancy to prevent the assembly and supported person from sinking and to make possible the conveyance of the person along with the certain necessary additional attachments as described. It is an improvement in that it cuts weight to a minimum which permits high speed and it reduces bulk to a minimum so that the support can be easily dismantled from its foils and motor for ease in transporting.

The relationship between a conventional hull and its foils is not the same as the relationship between the central body of the craft of the present invention and its foils because a person can do different things with the craft of the instant invention than can be done with a conventional hydrocraft. For example, first the craft can go into very shallow water, roughly knee deep without retracting its foils; a conventional hydrofoil boat has to retract its foils to do this or else because of its weight it would be necessary to provide very large foils that travel close to the surface of the water. Since lift is proportional to foil submergence for foil submergences of less than two chords depth, the foils of the heavier craft would have to be oversized. The added area cannot be provided by increasing foil span because span is limited for structural reasons. Thus a heavy craft must have oversized foils with small aspect ratios. Increasing foil area reduces top speed and decreasing aspects ratio reduces foil efficiency so that the heavier shallow water craft would be less efficient. The small craft, because of its light weight, has small foils with short chord length and so is not drastically affected by the dimensions of shallow water. It can fly safely in shallow water. Second, the craft can be quickly disassembled in shallow water into parts which one man can easily pick up and pack on his car. Here is a high speed craft which does not require a boat trailer. Third, the device can be maneuvered by the person shifting his weight much more readily than can be done with a craft of conventional hull because the ratio of human body weight to total weight is much greater. There is much more interplay between the person's weight and the foil's reactions in the present invention than can possibly exist in a conventional hydrocraft, thus the ability of the device to stabilize itself from disturbances and to accomplish flight over difficult sea conditions can be bettered by the skillful coordination and weight shifting of an experienced person. If one performs acrobatics with this device, skill will be necessary to master the interplay between the man's weight and the foil's reactions. The tie between the man, his motor and his foils is immediate and therefore is much more sensitive than that existing in a conventional boat hull with foils. Fourth, the high speed aquatic device in the flying condition has a lower center of gravity than that obtainable with a conventional hull craft with hydrofoils, thus the device's configuration improves stability characteristics. A fifth advantage is the improved performance obtainable because of the high speed aquatic device's high useful load to dead load ratio. Other advantages and improvements over conventional hull craft with hydrofoils will be made apparent by the following disclosure of characteristics and structure.

A still further object of the present invention is to provide a craft of the character described having a higher total load to useful load ratio than known heretofore for improved performance.

Another object of the present invention is to provide a device of novel design which may carry a swimmer from place to place for military or sporting reasons at high speeds on hydrofoils in moderately rough water and which will provide maximum protection to the rider should he fall off.

Another object of the present invention is to provide a water level platform or board on which the swimmer rides in the prone position and from which he can conveniently crawl into or out of the water and from which he may also perform acrobatics.

A further object of the present invention is to provide an assembly which is, light and can be easily dismantled or folded, is manually portable, can be transported on top of an automobile or in a submarine and which is inexpensive and is powered by a light inexpensive motor or other propulsion means.

The present invention relates to high speed aquatic devices; and more particularly to such devices as provide load support in normal cruising operation by the hydrodynamic lifting action of hydrofoils and which depend on displacement flotation support or partial support only when at rest or in transition from a state of rest to cruising speed.

An object of the present invention is to provide an arrangement of such a craft which is adapted for manufacture at the lowest attainable cost and which thereby may become available for the enjoyment and use of the maximum number of people.

A further object of the present invention is the provision of a craft which can be operated at minimum cost while providing the performance of a much more expensive craft.

Another object of the invention is the provision of a craft which affords the maximum attainable ratio of useful load capacity to total weight.

A still further object is the provision of a craft in which the displacement necessary for load support at rest is furnished in part by essential structure and in part by displacement of the load, with consequent elimination of surplus weight.

A further object is the provision of a high speed aquatic device which enters the hydrofoil load supporting regime at such low speed that careful streamlining of structure (other than foils) is unessential.

Another object is the provision of a craft which is light enough in weight to be easily handled into and out of the water and to be manually carried by a single person, which is easily dismantled and reassembled and which can be compactly stowed for ready transportation in or on a vehicle of limited capacity, such as an automobile.

Another object is the provision of a craft capable of supporting its load by hydrofoil lift over a wide range of speeds and thereby adapted to exploration and other uses in shallow water.

Another object is the provision of a craft of high static and dynamic stability adapted for stunting use in water sports and particularly adapted to safe use by a standing rider of limited skill.

A further object is the provision of such a craft provided with safety controls and other features which minimize the hazards of upsetting and other accidents.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view of a device constructed in accordance with the present invention shown in a flight condition.

Figure 2 is a top plan view of the form of invention illustrated in Figure 1 with the motor removed.

Figure 3 is a transverse section taken on the line 3—3 in Figure 2.

Figure 4 is a fragmentary transverse section taken on an enlarged scale showing a form of attachment of the hydrofoil, and its vane to the longitudinal support.

Figure 5 is a fragmentary side elevational view taken at an enlarged scale showing the vane securing members for securing the vanes to the longitudinal support body.

Figure 15 is an exploded perspective view of a modified form of the invention.

Figure 16 is a perspective view of a device constructed in accordance with the present invention being carried by a swimmer.

Figure 6:
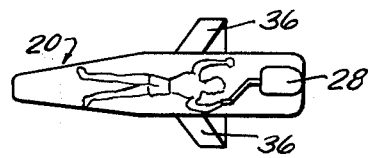
Figure 6 is a top plan view of a device constructed in accordance with the present invention having a rider thereon.
Figure 7:
Figure 7 is a front elevational view of the device constructed in accordance with the present invention in flight.

Referring now particularly to Figures 1 through 5 of the drawings one form of the invention is shown in which 20 designates generally a longitudinal support adapted to receive the body of a swimmer thereon in the prone position thereby associating the body with the foil as shown in dotted lines in Figure 1. This support may be characterized generally as being long, narrow and thin. As shown in transverse section in Figure 3, the support may consist of a top 21 or body receiving member and a bottom 22. These two members are joined and maintained in space relation by side boards, 23, 24. Longitudinally and periodically transversely are spacer support members 25 having openings 26 therein to permit free access from compartment to compartment of the support member. This construction is to provide a positive buoyancy chamber in the support when the internal portions thereof are filled with air. This buoyancy is adequate to float the weight of the support and foils, a motor and the body of the swimmer in a floating condition. The board-like support may be flooded with water and rendered negatively buoyant whereby it will settle to the bottom. The support may be equipped with flood valves which seat against sea pressure and a $CO_2$ blow system or similar method for removing water for expelling the water from the support 20 to render it positively buoyant (not shown). The support is provided with a cut out well 27 for accommodating an outboard motor 28 therethrough. This outboard motor 28 is secured to an anchor board member 29 by the conventional wing nuts or the like. A very important feature of this longitudinal support like board is that when flying at design speed the support does not provide hydrodynamic lift. It is to also be noted that the upper portion of the support upon which the rider lies prone in concavely curved transversely in order to form a cradle-like support for the body of the rider so as to more closely associate him with the foils.

The outboard motor 28 is so positioned on the support that the vertically disposed drive member 30 passes through the well 27 with the propeller 31 either in a pulling or pushing arrangement. The conventional guide or drive handle 32 is positioned to be grasped by the hand of the operator. The device can be steered by turning the motor.

Referring more particularly to Figure 4 it is to be noted that blocks 33 are provided in the sides at the forward portion of the support. These blocks may be of aluminum, magnesium, wood, glass, or any suitable material having anticorrosive characteristics and which are positioned therein to provide anchorage sockets for retaining bolts 34. These retaining bolts 34 cooperate with vane brackets 35 for securing the vane brackets 35 to the side of the support. The vane brackets 35 have vanes 36 connected thereto by bolts 37. While I have shown but one side in detail it is to be noted that bilateral symmetry is preserved throughout this construction and that the left hand side of the support is constructed in an identical manner. The vanes 36 may be arranged to be secured to the support at a given or predetermined angle to the horizontal.

A forward hydrofoil 38 is secured to the vanes 36 by bolts or like fastenings 39. In the form of invention shown in Figures 1 through 5 the forward hydrofoil is a single arcuate type foil which may be of wood, plastic, or ferrous or non-ferrous metals or any other suitable material. The main or forward hydrofoil 38 may be shifted from one position to another along the longitudinal support 20 due to the plurality of threaded sockets 33A spaced along the blocks 33, as best seen in Figure 5. The adjustment of the foil 38 along the longitudinal support may be effected to compensate for the sea state; i.e. in a sea state from 0 to 1 the main foil will be well aft; in the sea state of 1 the foil will be in medial position which is substantially located at the center of gravity of the craft; in a sea state from 1 to 3 the foil will be in its forward most position.

Figure 12:
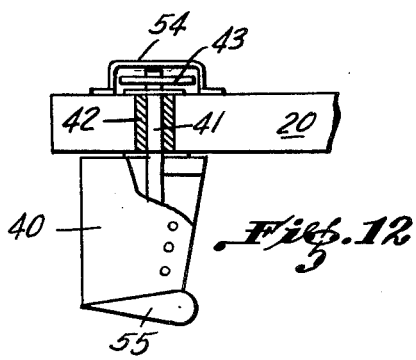
Figure 12 is a fragmentary side elevational view with parts broken away and parts shown in section of the rudder and rear hydrofoil construction.
Figure 13:
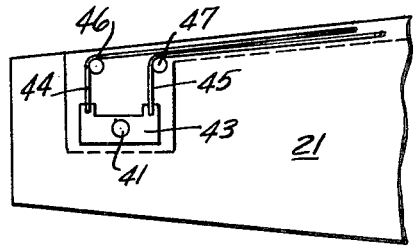
Figure 13 is a top plan view of the board for support of Figure 12 taken at an enlarged scale showing the rudder control mechanism.
Figure 14:
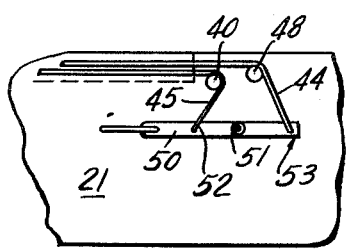
Figure 14 is a top plan view of the rudder control steering mechanism taken at an enlarged scale.

Referring to Figures 12 to 14 a form of rudder device is shown in which 40 designates a vertical vane having a surface area sufficient to impart a rudder effect in steering the craft. This strut 40 has a pivot pin 41 rotatably journaled in a bearing 42 secured to the rear of the craft support. Extending above the support top 21 the pivot pin 41 has secured thereto a steering arm 43 to the free ends of which are secured two steering cables 44, 45. The cables 44, 45 are roved over sheaves 46, 47 at the rear of the support and sheaves 48, 49 at the front end of the support and are connected to a tiller arm 50 pivoted to the top 21 at 51. These connections to the arms are made at points 52, 53 removed from the pivot 51. The whole sheave and cable system is provided with a cover 54 to prevent the swimmer attached to the support from becoming fouled therewith.

Secured to the lower free end of the rudder 40 is the rear foil 55, the span of which is decreased at the sacrifice of rear foil efficiency in order to keep the foil within bounds of the support 20 so as to lessen the chances of injuring a fallen rider. This foil exerts little or no lifting effect to the support and may therefore be quite small.

Figure 10:
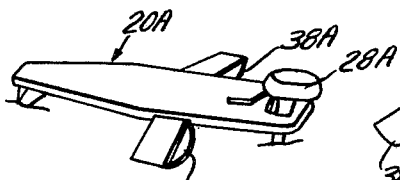
Figure 10 is a perspective view of a modified form of invention having two hydrofoils in flight.
Figure 11:
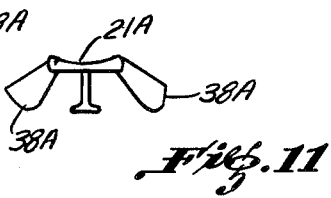
Figure 11 is a front elevational view of the device shown in Figure 10.

In the modified form of the invention shown in Figures 10 and 11 the main hydrofoil may consist of a pair of bowed foils 38A of known or developable design.

The vane brackets 35 which secure the vanes 36 to the support 21 are two in number for each vane. These are shown as 35 and 35A in Figure 5. The forward bracket 35 is secured to the forward part of the strut 36 which forms with bolt 34 the pivot point of angular adjustment. It is secured to the support at the desired opening 33A, by setting the bolt 34 in the block 33. The rear bracket 35A has an arcuate slot 35B therein through which the rear retaining bolt 34A passes. With the forward bolt 34 as the pivot the vane may be set to the desired angle of attack for the main foil 38 depending upon the sea state and the rear bolt 34A cooperating with the slot 35B will permit this arcuate movement of the vane 36 over the limits defined by the slot 35B. When the desired angle is reached the rear bolt 34A is set and locked in place. The bracket 35A may be serrated as could be the head of the bolt 34A to prevent this angular adjustment from slipping.

In operation the craft may be transported in knocked-down or collapsed condition with the vanes 36, hydrofoils 38, motor and rudder in disassembled compact condition requiring a minimum of transverse and vertical space. The motor may be carried in the trunk of an automobile while the support, vanes and foils could be carried on the roof of the vehicle or any other means for transporting.

When the area is reached where hydrocraft exploration is to take place the craft may be assembled in the following manner:

The support may be placed upon the ground with its bottom up. The vanes 36 and their brackets 35, 35A are first secured to the board. The operator determines the sea state to be encountered for selecting the position in which the main foil 38 is to be set with respect to the longitudinal axis as well as the preferred angle of attack of the main foil which is preserved by the securing and locking of bolt 34A in place after bolt 34, which acts as the pivot point of the vane 36, has been set in place in the selected opening 33A in the side of the support. The vanes are set at about degress angle of attack more than the main foil so that they give a lot of lift at slow speed, thus getting the support out of the water early in take off and to prevent the device from diving under the water surface in the event of accidental high speed water entry.

The main foil 38 may then be secured to the then free ends of the vanes 36, as by bolts and nuts 39. The rudder 40 and rear foil may then be attached by securing the rudder 40 to the pivot 41 by shear pins held in place by cotter pins or the like.

The support and connected foils may then be picked up and carried into the water with foils down and the support will float. The outboard motor 28 is then carried out to the floating craft and connected thereto as by inserting the drive shaft 30 and propeller 31 through the well 27 in the support and then securing the motor attaching screws to the motor mount 29 which is permanently anchored to the top 21 of the support 20.

The rudder tiller arm 50 is then checked to assure proper rudder operation. The outboard motor tiller arm and throttle 32 are checked, and the craft is now ready for operation.

The craft normally floats in a hydrostatic condition unless the support has been intentionally flooded to cause it to sink out of sight for security reasons until its use is immediate. When the support is flooded down the intake and exhaust of the motor must be plugged to prevent their flooding or a submersible motor should be employed.

When the craft is being propelled it attains a state of "flying" as used in this art which means the support 20 rises clear of the water and is supported in such elevated condition by the hydrofoils 38, 55.

Figure 8:
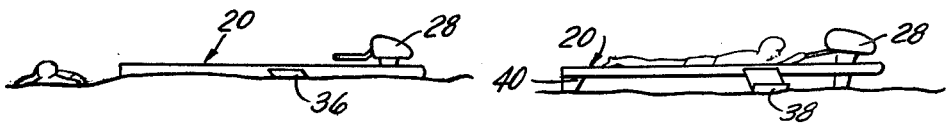
Figure 8 is a side elevational view of the device of Figure 1 shown in a floating condition with a swimmer approaching same from the rear.
Figure 9:
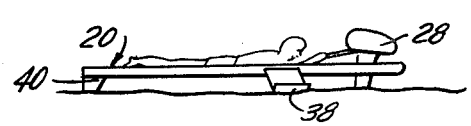
Figure 9 is a side elevational view of the device of Figure 8 shown in flight.

With the craft in a floating condition it may be boarded by a swimmer from the water, as shown in Figure 8, who approaches the craft from the rear grasping a hold on each side of the board with his hands, pushing down and pulling forward so as slide the chest and hips over the stern of the support. Once on he can work his way forward by either sliding or crawling. When the swimmer is in position and has attached himself to the foils by means of the support he then starts the motor 28 in the conventional manner.

During take off dynamic lift is provided by the vanes and foils. The support contributes buoyancy in the transition period of proceeding from a standstill to slow forward motion. As forward motion increases the front end of the support is quickly lifted by the vanes. The rear of the support may then be planing and may momentarily contribute some lift although not necessarily so because the stabilizing foil in the rear, having had its angle of attack greatly increased due to the change in trim caused by the vanes, will carry the major portion of the weight aft so that early in take off although the support is still wet it provides no lift. The foil and vanes carry the load. It has been found that concavely curving the bottom such as shown in Figure 3, will also provide a cushioning effect during sudden landings thus softening teh impact for the rider should the device fly clear of the water on the back-side of a steep wave and land against the side of the next approaching wave.

As engine speed is increased the support carrying the rider rises above the surface of the water on the foils to a "flying" condition as shown in Figures 1, 7, 9 and 10. In this "flying" condition the supporting vanes are out of the water but not so high as to pull the propeller out. In this flying condition the drag is greatly reduced particularly so in moderately rough water and fuel consumption is decreased resulting in an increase in cruising range.

The device may be used for fast exploratory searches in shallow water where heretofore hydrofoil craft such as that shown in Tietjens have had to retract the hydrofoils thereby increasing the draft of the craft and the depth of the screw in the water which of necessity limits the operational use of such craft.

While I have shown the engine or motor 23 mounted on the front of the support it will be appreciated that the engine may be mounted on the rear to leave the front more accessible to the vision of the rider. Also while I have shown the propulsion plant as an outboard motor it will be understood that an engine driving an air screw or developing a reactionary air or gas or any other producer of thrust may be employed as a prime mover.

The motor may also be provided with the conventional "dead mans" switch to cut the motor off should the rider be thrown from the board. Such a device is shown in U.S. Patent No. 1,881,251 and is intended to stop the screws to prevent the thrown rider from becoming caught therein and to stop an otherwise run away craft.

Such refinements as non-skid mats for the rider and an anchor for the board as well as a spear rifle carrying bracket or other weapon bracket may be applied to the support for the convenience of the rider.

The present invention may be employed to carry spear fishermen from reef to reef or from one hunting ground to another; or, it may be employed for frog men landing parties in a military or naval operation. The low silhouette permits moderate range, high speed, undetected entry under radar screens.

An example of the support 20 in one physical embodiment is a support about two and a half feet wide, about nine feet long and about three inches thick. This support is hollow, reinforced, and water tight. It may be constructed of any of the known materials having structural qualities. The support may also be equipped with hand rails or hand grips for high speed operation.

The device of the invention may be modified for both surface piercing and submerged foils.

The outboard motor when employed with certain designs of the present invention does not require any shaft couplings or elongations for use therewith. The vane angle may be varied so that the vanes will increase the lift of the board during take-off and will act or impart a cushioning effect for sea entry. An underlying thesis of the specification is the fact that this invention is applying the hydrofoils and propulsion means directly to the human being and employing in connection therewith the minimum amount of structural members necessary to integrate the foils with the body. In some modifications of the invention the outboard motor or propulsion means is floated by a buoyant body which may consist of, for example, the tank 22B in Figure 15 and the hollow support 20 in Figure 1.

Referring to the form of the invention shown in Figure 15, the stress frame may consist of tubular members 20B converging into a clamp 21B at the rear and being secured to a hydrostatic flotation tank 22B the walls of which are substantially flat except for the rounded nose 23B. Defined within and through the tank 22B is a motor well 24B having an outboard motor mounting bracket 25B for receiving an outboard motor 26B for attachment thereto.

On each side of the tank 22B are vane attaching lugs 27B, 28B for receiving and retaining vane securing bolts 29B, 30B which pass through mounting members of the vanes 31B, 32B. The bolts 29B, 30B may be threadedly received and retained in the lugs 27B or 28B. The main hydrofoil 33B of the bow type is secured to the vanes 31B, 32B in any suitable manner.

The clamp 21B has two downwardly extending jaws which receive and retain a rudder 34B by means of bolts 35B or other suitable fasteners. Secured to the base of the rudder 34B and extending transversely from each side thereof are stabilizer foils 35B.

Lying between the clamp 21B and tank 22B is a leg rest 36B having upturned ends 37B, 38B. The rest 36B may be welded or otherwise secured to the tubular stress frame members 20B.

Past history of hydrofoil development has been primarily concerned with the application of hydrofoils to a craft of conventional hull design. This practice has encumbered hydrofoil craft with a conventional hull member that has inherent properties of bulk and weight that necessitate expensive manufacturing care to provide rigidity, watertightness and streamlining of large bottom and side surfaces.

My invention has as its fundamental point of emphasis the provision of a device at cruising speeds that supports its useful load on hydrofoils with the least amount of structure necessary for maintaining the useful load; propulsion means, hydrofoils and flotation enclosures in operative position.

The concept of this invention as expressed in all embodiments and arrangements deletes all unnecessary surfaces, parts, weight and structure and provides a device which has inherent advantages of construction simplicity, lower power requirements, higher speeds, increased stability, compactness and portability.

As expressed in all forms of this invention described hereinabove the high speed aquatic device is composed of four elements that are fundamental to its operation. Those four elements are the hydrofoils, the propulsion system, the stress frame and the flotation enclosures. The concepts of design of these elements underlying the form illustrated and described are as follows:

Hydrofoils

The hydrofoils 38 and 33B provide support and stability for the device when running at cruising and low speeds by their hydrodynamic lifting action. The lifting action is obtained only if the hydrofoils are under, or partially under, the surface of the water and have forward motion. The hydrofoils have a large lateral dimension, span, a much smaller longitudinal dimension, chord, and a still much smaller vertical thickness dimension. The vertical-longitudinal cross-section is a streamlined airfoil type section. The major axis of this cross-section is set so as to be almost parallel to the longitudinal axis of the device; small positive incidence angles, hydrofoil leading edge high, are desirable for satisfactory lifting action. The hydrofoils must accomplish three important functions thus the hydrofoil surfaces may be classified into one or more of three categories: First, is the main hydrofoil surface which supports the load at cruising speeds; second, is the stabilizing surface which provides adequate longitudinal and lateral stability; third, is the vane surface which provides most of the dynamic lift during transition from static buoyancy support to hydrofoil support. The vane surface also prevents the device from diving under the surface of the water should the device unexpectedly broach clear of the water or porpoise. The hydrofoil main surface may lie in a horizontal plane, be laterally curved, or it may be laterally V-shaped. The main surface can be concentrated under the device's center of gravity or it can be distributed to two or more hydrofoils that are separated longitudinally or laterally or both ways.

The hydrofoil stabilizing surface is a hydrofoil surface located near and penetrating the water surface. Stabilizing surface is also surface that is, incidence angle nearly zero, hydrofoil surface located aft of the device's center of gravity. The stabilizing surfaces may be fixed or may be controllable.

Hydrofoil vanes are large, streamlined, tapering surfaces situated above the main and stabilizing surfaces. The vanes are set at a large incidence angle so that they raise or lift the device at slow speeds. At cruising speeds the vanes are out of the water.

Hydrofoils are the most efficient means for supporting small high speed water craft in motion so that it is possible to obtain greater speed with less engine. Furthermore, performance differences are amplified in moderately rough water because hydrofoils obtain lifting support from beneath the water surface and therefore operate under conditions which are more calm than those existing on the surface.

Hydrofoil advantages are increased by decreasing the total load supported. The elimination of all unnecessary parts and structure provides a device with less horsepower that can carry a given useful load faster and further than any existing kind of water craft.

Propulsion system

The drag of the device at all obtainable speeds is overcome by the net thrust from the propulsion system. The propulsion system can obtain its energy from any form of internal combustion engine, electric motor and battery, steam or compressed air engine, rocket or human effort. Thrust may be obtained from air or water propellers, high velocity jet reactions, paddles or paddle wheels, oscillating foils, or towing from a motor craft. It is desirable that the propulsion system be efficient, light weight and portable so that it may be readily attached or detached from its bracket on the stress frame. Small and medium size outboard motors are adequate for propelling the device with a swimmer at high speed. Mounting the propulsion system on the front of the device makes it easily accessible for controlling by a swimmer riding in the prone position. Locating the motor in the front also keeps a swimmer from getting cut by the propeller should he happen to fall off while the device is under way.

The use of hydrofoils with emphasis on minimum weight will minimize the drag at high speeds because hydrofoils have a high lift-drag ratio and the high speed aquatic device supports a small total load. Using a propulsion system that delivers a large percentage of its power in useful thrust will keep both the propulsion system and the fuel consumption small and light. These features add to the device's overall efficiency, portability and simplicity.

Buoyancy means

The high speed aquatic device without its useful load or a swimmer, that is, the assemblage of motor, hydrofoils and stress frame, obtains the necessary static buoyancy to prevent it from sinking when at rest from an arrangement of flotation enclosures. These flotation enclosures may be included as a part of a tubular structure stress frame or may consist of thin shell containers attached to the stress frame. Additional flotation enclosure capacity is desirable to provide for partial static buoyancy of the useful load or a swimmer. The useful load carried is a large portion of the total load carried so that employment of some of the displacement of the useful load will minimize the flotation enclosure capacity needed. Only sufficient flotation enclosure capacity for keeping the device and its useful load or swimmer floating statically with a reasonable trim so that the motor can be started is necessary. With my device the drag of the flotation enclosures are relatively unimportant because they are immersed only at low speed. At cruising speeds the device is supported by hydrofoils and the flotation enclosures are out of the water. At slow speeds, because of the light total load, the hydrofoils can support the device so that the transition from flotation support to hydrofoils support occurs at slow speed and careful streamlining of the flotation enclosures is unnecessary.

It is not necessary to rely on planing characteristics of the flotation enclosures for additional lifting support during transition because the hydrofoils can support the device's total load at slow speeds. The flotation enclosures or buoyancy means are hence not limited to forms which have good planing characteristics.

The high speed aquatic device will not sink if it is accidentally turned over or swamped in use because the flotation enclosures are completely enclosed, watertight containers. This feature adds safety to its use particularly at high speeds or in rough water.

Minimizing the flotation enclosure capacity provides watertight chambers that have less exposed surface to a pounding sea and therefore are less likely to develop leaks in rough water. Also violent maneuvers such as water entry at high speed will have less tendency to open up seams because enclosures which are totally enclosed can be constructed so as to be more rigid than if they had been constructed only partly enclosed.

Stress frame

As previously stated, the fundamental point of emphasis is to support the useful load at cruising speeds on hydrofoils. The device obtains the least amount of structure necessary to maintain the useful load, propulsion means and hydrofoils in proper operative relation from its stress frame.

The stress frame may be constructed as a thin wall of tubular structure with attachments for the propulsion system, the hydrofoils, the flotation enclosures and for receiving the useful load or a swimmer. In some designs, it may be practical to include some or all of the flotation enclosure capacity within the stress frame tubular structure. The hydrofoils are subject to both the weight of the useful load and the thrust from the propulsion system. It is desirable to arrange the structure so that the propulsion system thrust and useful load weight are applied directly to the hydrofoil attachment location. By intimately associating the useful load weight to the hydrofoil lift and the propulsion system thrust to the hydrofoil drag, structure bulk and weight are minimized.

Although the stress frame is in the water when the device is at rest, a small amount of forward velocity will cause the hydrofoils and vanes to lift most of the stress frame out of the water. The stress frame is hence not limited to a shape that is streamlined or which has good planing characteristics. Material used for structural purposes in the stress frame can be employed economically with good structural efficiency so that simplicity and light weight are emphasized.

There is no structure needed in the stress frame to support or rigidly reinforce large bottom or side surfaces. Rough water conditions or high speed water entry maneuvers cause large impact pressures on exposed surface areas. It is not necessary for the stress frame to be expanded to withstand the forces from wave impacts of side or quartering seas because the stress frame does not present large exposed areas. Wave impacts or water entry impacts on flotation enclosures that are included in the stress frame or attached to the stress frame are small because the capacity of the flotation enclosures are minimized and distributed.

The basic simplicity of the stress frame arrangement lends to economical manufacture. It is not necessary to construct the stress frame so that it remains watertight in use because the flotation enclosures provide the necessary static buoyancy. The stress frame can even be ventilated. The tubular structure can be readily jigged for fabrication; standard structural shapes and fittings are applicable. The quantity of material used in a simple stress frame structure minimizes cost and weight.

The stress frame provides a compact device which may be readily assembled and disassembled, which is light in weight, manually portable and may be compactly transported in a car, submarine, helicopter or any other conveyancy facility desired. The stress frame also floats within the water surface when the device is in a static condition so that it can be easily boarded by a swimmer.

*Advantages from weight reduction*

The first characteristic, light weight, is obtained as a minimum in the high speed aquatic device because its configuration deletes all extraneous structure. The advantage is a very low power requirement because the power requirement depends directly on the total drag and the total drag is affected by the total weight supported. Total drag is mainly composed of five sources of drag which are profile drag, induced drag, wave drag, surface piercing drag and drag resulting from the underwater support of the propulsion system thrust producing element. The latter drag will not be included as high speed aquatic device drag here because it is a force which reduces the propulsion system net thrust and is not transferred through the light weight stress frame. The drag of the underwater support for the thrust producing element does, however, depend on the total weight supported because heavy total loads require more thrust. It will not be necessary to include this additional information to show the drag reduction improvements realized by eliminating all extraneous structure.

Because both the profile drag and the surface piercing drag are proportional to the total weight supported, and both the induced drag and the wave drag are proportional to the total weight supported squared, a light weight configuration will have little total drag and a small power requirement for all speeds where the total weight is supported entirely by hydrofoils.

The high speed aquatic device provides a configuration which deletes all extraneous structure so that total weight carried is greatly reduced thus realizing cruising speed performance that has been heretofore unattainable.

*Stabilization improvements due to the low center of gravity*

The second characteristic obtained by the high speed aquatic device configuration that provides water transportation improvements and advantages is the low center of gravity. Structure which is normally out of the water when the useful load is supported by hydrofoils increases the height of the center of gravity. The high speed aquatic device configuration has the least possible amount of structure so that its center of gravity is no higher than the minimum requirement needed to comply with seaway conditions. Secondly, the high speed aquatic device carries a person in the prone position so that the person or useful load has his weight concentrated closer to the water surface so that the center of gravity of the total weight supported is minimized. The advantage of a low center of gravity is three-fold. Low center of gravity improves lateral stability, longitudinal stability and stabilization on fast turns. Obtaining adequtae longitudinal and lateral stability without sacrificing performance or introducing involved, complex control schemes is the very heart of hydrofoil development.

Lowering the center of gravity improves the longitudinal and lateral static stability in a linear fashion. Dynamic stability is improved to a greater extent than static stability because dynamic stability depends on the center of gravity height squared.

Stability on fast turns as related to side slipping and banking is determined by the center of gravity height because lowering the center of gravity height increases the ability of the device to bank into fast turns.

Lateral stability improvements possible with a configuration that has a low center of gravity can best be understood from the metacenter concept. Consider a hydrofoil which is shaped so that its lateral axis forms the arc of a circle. The lift from each element of arc is directed towards the center of the arc's circle so that the resultant lifting force passes through the circle center regardless of the foil's submergence or the device's roll. The center of the arc's circle is known as the metacenter. Hydrofoils which are parabolic or V or elliptic shapes rather than circles or a pair of foils side by side also have a metacenter which can be considered to have a fixed location for small angles of roll.

The device will have static lateral stability if the center of gravity of the device is located below the metacenter because small roll angles will create a moment that is opposed to the direction of roll.

With given foil shapes, a configuration that permits a lower center of gravity increases the distance between the metacenter and the center of gravity so that the righting moment and the lateral stability are correspondingly increased. Because of its configuration, the high speed aquatic device center of gravity is no higher than the minimum requirement needed to comply with seaway conditions. This feature is an improvement because it provides increased lateral stability.

The high speed aquatic device is a configuration that minimizes the height of the center of gravity because it carries its useful load or a swimmer in the prone position and because all extraneous structure that has been eliminated is that which normally would be out of the water when supported by hydrofoils. Obtaining the lowest possible center of gravity location within compliance with seaway conditions is an improvement because with a given set of hydrofoils, it provides a device which can bank into fast turns better without resorting to means that sacrifice performance or that require involved, complex control schemes.

Although I have disclosed herein the best forms of the invention known to me at this time, I reserve the right to all such modifications and changes as may come within the scope of the following claims.

What I claim is:

1. A hydrofoil craft for transporting a swimmer in the prone position comprising a support comprising a relatively vertically thin substantially flat stress frame and a buoyancy means connected to said stress frame at its forward portion, said support being of a length sufficient to support a swimmer in the prone position, a main hydrofoil supported by said support and extending transversely of said support at a level beneath the support, a secondary hydrofoil secured to said frame beneath same proximate the rear end thereof, and propulsion means secured to said buoyancy means for propelling the craft to a flying condition.

2. A hydrofoil craft as claimed in claim 1 wherein the buoyancy means comprises a flat thin buoyancy tank to provide hydrostatic buoyancy for said support, said hydrofoils, said propulsion means and said swimmer and said stress frame comprises an open frame structure rearwardly of said tank, said tank having a well opening therethrough to permit passage of a portion of the propulsion means therethrough.

3. A hydrofoil craft as claimed in claim 1 wherein the propulsion means is an outboard motor.

4. A hydrofoil craft as claimed in claim 1 wherein said stress frame further comprises leg rest means secured to the stress frame positioned to provide a rest for the legs of a swimmer in the prone position.

(References on following page)

References Cited in the file of this patent

UNITED STATES PATENTS

| | | |
|---|---|---|
| 857,951 | Meacham et al. | June 25, 1907 |
| 1,187,268 | Crocco | June 13, 1916 |
| 1,814,772 | Sterling | July 14, 1931 |
| 2,045,645 | Hansen | June 30, 1936 |
| 2,470,137 | Brown | May 17, 1949 |
| 2,593,806 | Steele | Apr. 22, 1952 |
| 2,722,021 | Keogh-Dwyer | Nov. 1, 1955 |
| 2,748,400 | Kregall | June 5, 1956 |

FOREIGN PATENTS

| | | |
|---|---|---|
| 382,812 | Great Britain | Nov. 3, 1932 |
| 458,770 | Great Britain | Dec. 28, 1936 |
| 696,860 | France | Jan. 9, 1931 |

OTHER REFERENCES

Ser. No. 268,421, Tietjens (A.P.C.), published May 11, 1943.